United States Patent
Toyama

(10) Patent No.: US 12,541,994 B2
(45) Date of Patent: Feb. 3, 2026

(54) INFORMATION PROCESSING APPARATUS, INFORMATION PROCESSING METHOD, AND NON-TRANSITORY RECORDING MEDIUM

(71) Applicant: NEC Corporation, Tokyo (JP)

(72) Inventor: Hiroaki Toyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/841,000

(22) PCT Filed: Mar. 2, 2022

(86) PCT No.: PCT/JP2022/008912
§ 371 (c)(1),
(2) Date: Aug. 23, 2024

(87) PCT Pub. No.: WO2023/166619
PCT Pub. Date: Sep. 7, 2023

(65) Prior Publication Data
US 2025/0166340 A1    May 22, 2025

(51) Int. Cl.
*G06V 40/12* (2022.01)
*G06V 10/32* (2022.01)

(52) U.S. Cl.
CPC .......... *G06V 40/1359* (2022.01); *G06V 10/32* (2022.01); *G06V 40/1365* (2022.01)

(58) Field of Classification Search
CPC ............... G06V 10/32; G06V 40/1359; G06V 40/1365; G06V 40/00–1394
See application file for complete search history.

(56) References Cited

U.S. PATENT DOCUMENTS

| | | | |
|---|---|---|---|
| 2007/0031014 A1* | 2/2007 | Soderberg | G06V 40/1371 382/125 |
| 2016/0379038 A1* | 12/2016 | Vural | G06V 10/993 382/125 |
| 2017/0091526 A1* | 3/2017 | John Archibald | G06V 40/1371 |
| 2018/0276454 A1* | 9/2018 | Han | G06V 40/172 |
| 2022/0343672 A1* | 10/2022 | Lee | G06V 40/1353 |
| 2023/0144689 A1 | 5/2023 | Hirokawa et al. | |

FOREIGN PATENT DOCUMENTS

| | | |
|---|---|---|
| JP | 2006-039777 A | 2/2006 |
| JP | 2007-079771 A | 3/2007 |
| JP | 2008-171238 A | 7/2008 |
| JP | 2020-161938 A | 10/2020 |
| WO | 2007/141880 A1 | 12/2007 |
| WO | 2021/192315 A1 | 9/2021 |

OTHER PUBLICATIONS

International Search Report for PCT Application No. PCT/JP2022/008912, mailed on May 31, 2022.

* cited by examiner

*Primary Examiner* — Premal R Patel
(74) *Attorney, Agent, or Firm* — Sughrue Mion, PLLC

(57) ABSTRACT

An information processing apparatus includes: an acquisition unit that acquires a pattern image obtained by imaging ridges of a living body; an estimation unit that sets a sampling point in the pattern image and estimates ridge spacing of the sampling point; and a normalization unit that normalizes a size of the pattern image on the basis of an estimation result by the estimation unit.

7 Claims, 9 Drawing Sheets

INFORMATION PROCESSING APPARATUS, INFORMATION PROCESSING METHOD, AND NON-TRANSITORY RECORDING MEDIUM

This application is a National Stage Entry of PCT/JP2022/008912 filed on Mar. 2, 2022, the contents of all of which are incorporated herein by reference, in their entirety.

TECHNICAL FIELD

This disclosure relates to technical fields of an information processing apparatus, an information processing method, and a recording medium.

BACKGROUND ART

Patent Literature 1 describes a technique/technology of: extracting a feature point and a core wire from a first stripe pattern image and a second stripe pattern image in which stripe patterns are formed by ridges, and generating feature point data and core wire data; collating two sets of the feature point data and the core wire data respectively extracted from the first stripe pattern image and the second stripe pattern image, and calculating a matching score; and analyzing the second stripe pattern image and calculating an image analysis score in relation to a region in which a corresponding feature point pair of the first stripe pattern image is present, and correcting the matching score, in order to contribute to an improvement of verification accuracy. Patent Literature 2 describes a technique/technology of: enlarging a specific fingerprint image; creating registration data including information on the enlarged fingerprint image; storing the created registration data in a storage unit; and collating the registration data stored in the storage unit with data relating to a fingerprint, which is inputted for a collation purpose, to authenticate the fingerprint. Patent Literature 3 describes a technique/technology of: inputting fingerprint information on a registration target; extracting the number of ridges and an interval between the ridges in a predetermined region from the inputted fingerprint information; classifying the inputted fingerprint information into one of a plurality of groups, on the basis of the number of ridges and the interval extracted, in accordance with a degree of density of fingerprints; and registering the inputted fingerprint information in association with the classified group.

CITATION LIST

Patent Literature

Patent Literature 1: International Publication No. WO2021/192315
Patent Literature 2: International Publication No. WO2007/141880
Patent Literature 3: JP2006-039777A

SUMMARY

Technical Problem

It is an example object of this disclosure to provide an information processing apparatus, an information processing method, and a recording medium that aim to improve the techniques/technologies disclosed in Citation List.

Solution to Problem

An information processing apparatus according to an example aspect includes: an acquisition unit that acquires a pattern image obtained by imaging ridges of a living body; an estimation unit that sets a sampling point in the pattern image and estimates ridge spacing of the sampling point; and a normalization unit that normalizes a size of the pattern image on the basis of an estimation result by the estimation unit.

An information processing method according to an example aspect includes: acquiring a pattern image obtained by imaging ridges of a living body; setting a sampling point in the pattern image and estimating ridge spacing of the sampling point; and normalizing a size of the pattern image on the basis of an estimation result.

A non-transitory recording medium according to an example aspect is a recording medium on which a computer program that allows a computer to execute an information processing method is recorded, the information processing method including: acquiring a pattern image obtained by imaging ridges of a living body; an estimation unit that sets a sampling point in the pattern image and estimating ridge spacing of the sampling point; and normalizing a size of the pattern image on the basis of an estimation result-by the estimation unit.

DESCRIPTION OF EXAMPLE EMBODIMENTS

Hereinafter, an information processing apparatus, an information processing method, and a recording medium according to example embodiments will be described with reference to the drawings.

1: First Example Embodiment

An information processing apparatus, an information processing method, and a recording medium in a first example embodiment will be described. The following describes the information processing apparatus, the information processing method, and the recording medium in the first example embodiment, by using an information processing apparatus 1 to which the information processing apparatus, the information processing method, and the recording medium in the first example embodiment are applied.

1-1: Configuration of Information Processing Apparatus 1

Figure 1:
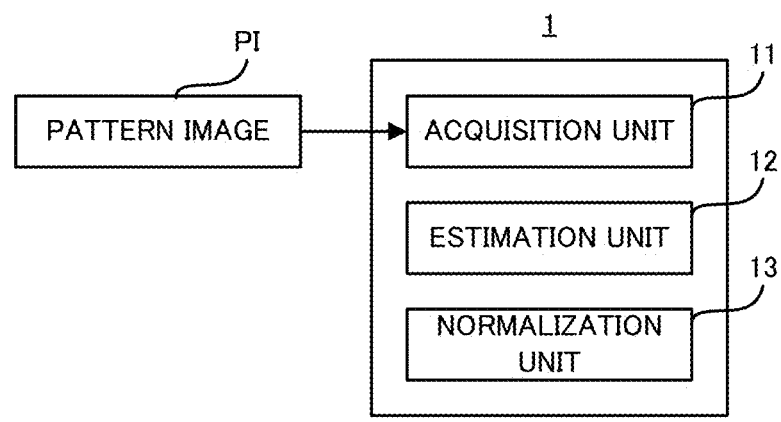
FIG. 1 is a block diagram illustrating a configuration of an information processing apparatus in a first example embodiment.

With reference to FIG. 1, a configuration of the information processing apparatus 1 in the first example embodiment will be described. FIG. 1 is a block diagram illustrating the configuration of the information processing apparatus 1 in the first example embodiment.

As illustrated in FIG. 1, the information processing apparatus 1 includes an acquisition unit 11, an estimation unit 12, and a normalization unit 13. The acquisition unit 11 acquires a pattern image PI obtained by imaging ridges of a living body. The estimation unit 12 sets a sampling point in the pattern image PI and estimates ridge spacing of the sampling point. The normalization unit 13 normalizes a size of the pattern image PI on the basis of an estimation result by the estimation unit 12.

1-2: Technical Effect of Information Processing Apparatus 1

Since the information processing apparatus 1 in the first example embodiment is configured to acquire a pattern image whose size is normalized, it is possible to improve a success rate of verification when the pattern images are verified, for example.

2: Second Example Embodiment

An information processing apparatus, an information processing method, and a recording medium in a second example embodiment will be described. The following describes the information processing apparatus, the information processing method, and the recording medium in the second example embodiment, by using an information processing apparatus 2 to which the information processing apparatus, the information processing method, and the recording medium in the second example embodiment are applied.

In fingerprint verification, patterns of ridges are verified in many cases. For example, even in the case of fingerprints of the same person, verification may be failed when the patterns of the ridges are different in size. For example, when a fingerprint image registered in childhood is verified with a fingerprint image captured in adulthood, the verification of the fingerprint images may be failed due to the difference in size between the patterns of the ridges, even though the patterns of the ridges are similar.

The fingerprint verification is originally used for verification of criminals, and the fingerprint verification for children is not considered in many cases. In recent years, the fingerprint verification has been used for personal authentication, resulting in an increase in the fingerprint verification for children. In addition, the fingerprint image registered in childhood may be used to authenticate a grown-up person.

In addition, for example, even fingerprint images obtained by imaging a finger of the same person with different resolutions, have different sizes of the patterns of the ridges. Even when the patterns of the ridges are the same, if the patterns of the ridges are different in size, the verification of the fingerprint images may be failed because coordinate distributions of feature points of the fingerprints may be different. There is a significant demand to realize the fingerprint verification using fingerprint images of different sizes.

Furthermore, in many cases, an engine for performing extraction of the ridges and feature quantities from a fingerprint image PI, verification of the fingerprint images PI, or the like, is constructed to be optimal to the pattern of the ridges of a predetermined size. For example, an engine may be constructed to be optimal to the extraction of ridges and feature quantities from an adult fingerprint image PI captured at 500 ppi, and to the verification of the adult fingerprint images PI captured at 500 ppi. Therefore, in the fingerprint verification, it is preferable to normalize the fingerprint images PI to the pattern of the ridges of the predetermined size.

A size of the finger often correlates with the ridge spacing. For example, the size of the finger is significantly different between an infant and an adult. On the other hand, the patterns of the ridges of the fingerprints in infanthood are often unchanged even in adulthood. That is, it is likely that the ridge spacing is also changed as the size of the finger is changed. In fact, in many cases, the ridge spacing of a child is narrower and a ridge pitch of a child is finer than those of an adult. Therefore, the information processing apparatus 2 in the second example embodiment may normalize a size of the fingerprint image PI on the basis of the ridge spacing.

2-1: Configuration of Information Processing Apparatus 2

Figure 2:
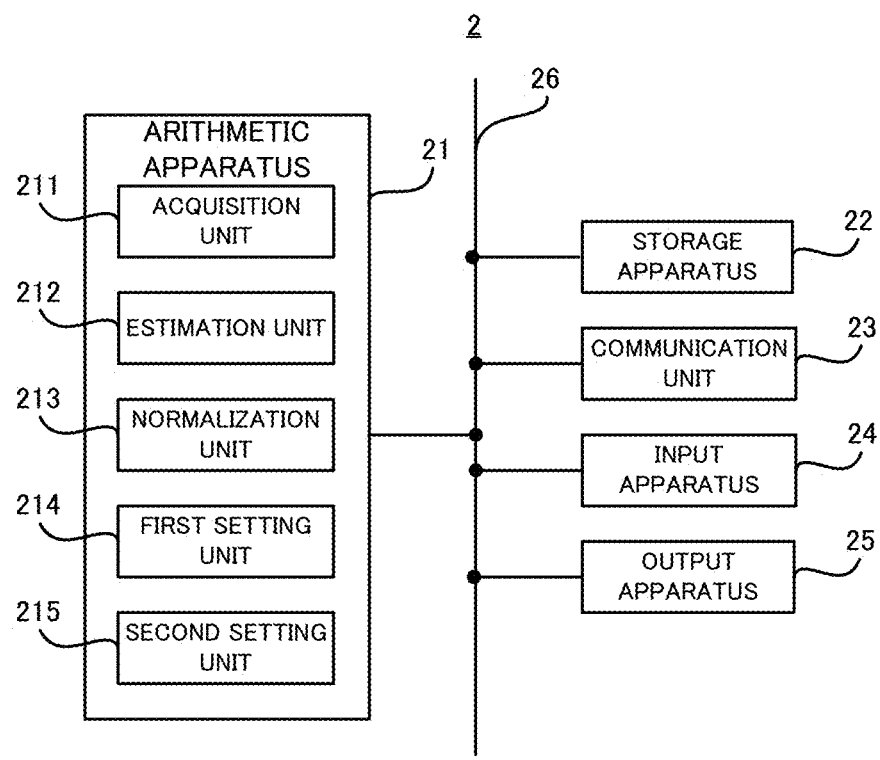
FIG. 2 is a block diagram illustrating a configuration of an information processing apparatus in a second example embodiment.

With reference to FIG. 2, a configuration of the information processing apparatus 2 in the second example embodiment will be described. FIG. 2 is a block diagram illustrating the configuration of the information processing apparatus 2 in the second example embodiment.

As illustrated in FIG. 2, the information processing apparatus 2 includes an arithmetic apparatus 21 and a storage apparatus 22. Furthermore, the information processing apparatus 2 may include a communication apparatus 23, an input apparatus 24, and an output apparatus 25. The information processing apparatus 2, however, may not include at least one of the communication apparatus 23, the input apparatus 24, and the output apparatus 25. The arithmetic apparatus 21, the storage apparatus 22, the communication apparatus 23, the input apparatus 24, and the output apparatus 25 may be connected through a data bus 26.

The arithmetic apparatus 21 includes at least one of a CPU (Central Processing Unit), a GPU (Graphics Processing Unit), and a FPGA (Field Programmable Gate Array), for example. The arithmetic apparatus 21 reads a computer program. For example, the arithmetic apparatus 21 may read a computer program stored in the storage apparatus 22. For example, the arithmetic apparatus 21 may read a computer program stored by a computer-readable and non-transitory recording medium, by using a not-illustrated recording medium reading apparatus provided in the information processing apparatus 2 (e.g., the input apparatus 24 described later). The arithmetic apparatus 21 may acquire (i.e., download or read) a computer program from a not-illustrated apparatus disposed outside the information processing apparatus 2, through the communication apparatus 23 (or another communication apparatus). The arithmetic apparatus 21 executes the read computer program. Consequently, a logical function block for performing an operation to be performed by the information processing apparatus 2 is realized or implemented in the arithmetic apparatus 21. That is, the arithmetic apparatus 21 is allowed to function as a controller for realizing or implementing the logical functional block for performing an operation (in other words, processing) to be performed by the information processing apparatus 2.

FIG. 2 illustrates an example of the logical functional block realized or implemented in the arithmetic apparatus 21 to perform an information processing operation. As illustrated in FIG. 2, an acquisition unit 211 that is a specific example of the "acquisition unit", an estimation unit 212 that is a specific example of the "estimation unit", a normalization unit 213 that is a specific example of the "normalization unit", a first setting unit 214 that is a specific example of the "first setting unit", and a second setting unit 215 that is a specific example of the "second setting unit" are realized or implemented in the arithmetic apparatus 21. The information processing apparatus 2, however, may not include at least one of the first setting unit 214 and the second setting unit 215. Each operation of the acquisition unit 211, the estimation unit 212, the normalization unit 213, the first setting unit 214, and the second setting unit 215 will be described later with reference to FIG. 3 to FIG. 5.

The storage apparatus 22 is configured to store desired data. For example, the storage apparatus 22 may temporarily store a computer program to be executed by the arithmetic apparatus 21. The storage apparatus 22 may temporarily store data that are temporarily used by arithmetic apparatus 21 when the arithmetic apparatus 21 executes the computer program. The storage apparatus 22 may store data that are stored by the information processing apparatus 2 for a long time. The storage apparatus 22 may include at least one of a RAM (Random Access Memory), a ROM (Read Only Memory), a hard disk apparatus, a magneto-optical disk apparatus, a SSD (Solid State Drive), and a disk array apparatus. That is, the storage apparatus 22 may include a non-transitory recording medium.

The communication apparatus 23 is configured to communicate with an apparatus external to the information processing apparatus 2 through a not-illustrated communication network. The communication apparatus 23 may acquire the fingerprint image PI used for the information processing operation from an imaging apparatus through the communication network, for example.

The input apparatus 24 is an apparatus that receives an input of information to the information processing apparatus 2 from an outside of the information processing apparatus 2. For example, the inputting apparatus 24 may include an operating apparatus (e.g., at least one of a keyboard, a mouse, and a touch panel) that is operable by an operator of the information processing apparatus 2. For example, the input apparatus 24 may include a reading apparatus that is configured to read information recorded as data on a recording medium that is externally attachable to the information processing apparatus 2.

The output apparatus 25 is an apparatus that outputs information to the outside of the information processing apparatus 2. For example, the output apparatus 25 may output information as an image. That is, the output apparatus 25 may include a display apparatus (a so-called display) that is configured to display an image indicating the information that is desirably outputted. For example, the output apparatus 25 may output information as audio/sound. That is, the output apparatus 25 may include an audio apparatus (a so-called speaker) that is configured to output audio/sound. For example, the output apparatus 25 may output information onto a paper surface. That is, the output apparatus 25 may include a print apparatus (a so-called printer) that is configured to desired information on the paper surface.

2-2: Information Processing Operations Performed by Information Processing Apparatus 2

Figure 3:
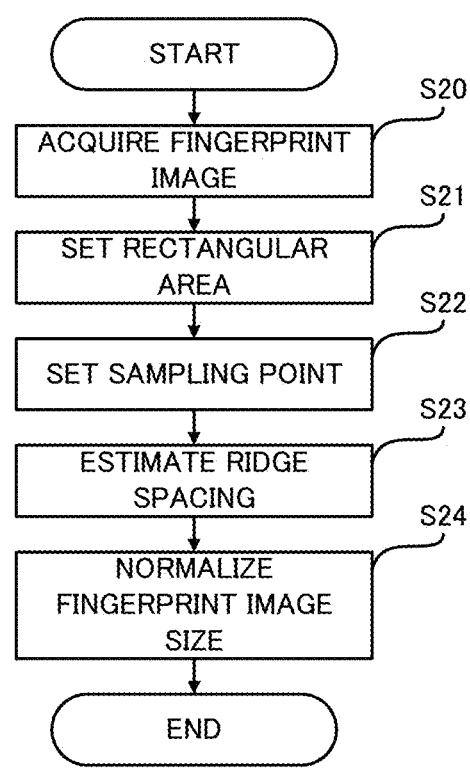
FIG. 3 is a flowchart illustrating a flow of an information processing operation performed by the information processing apparatus in the second example embodiment.
Figure 4A:
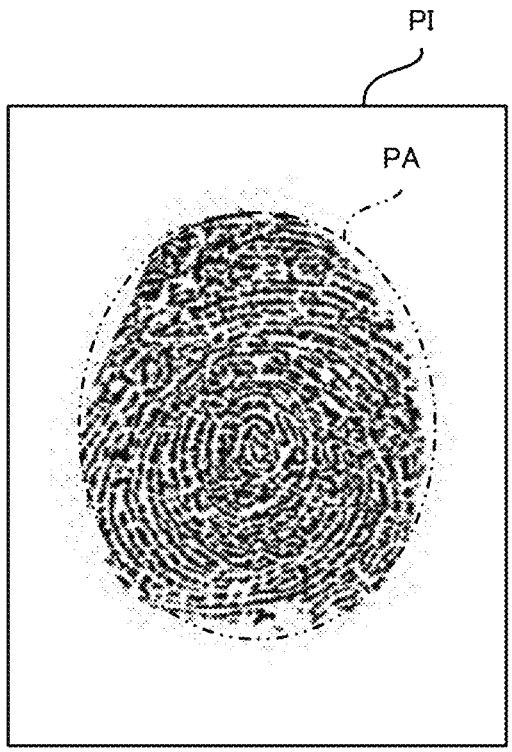
FIG. 4A is a conceptual diagram illustrating an information processing operation of the information processing apparatus in the second example embodiment.
Figure 4B:
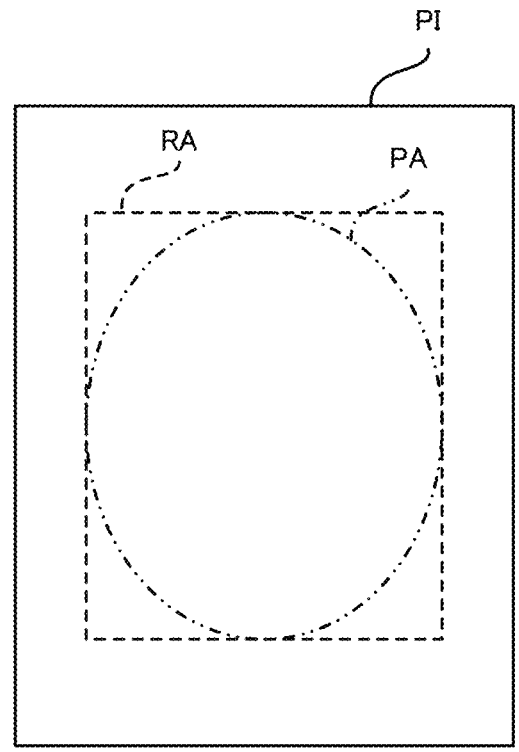
FIG. 4B is a conceptual diagram illustrating an information processing operation of the information processing apparatus in the second example embodiment.
Figure 4C:
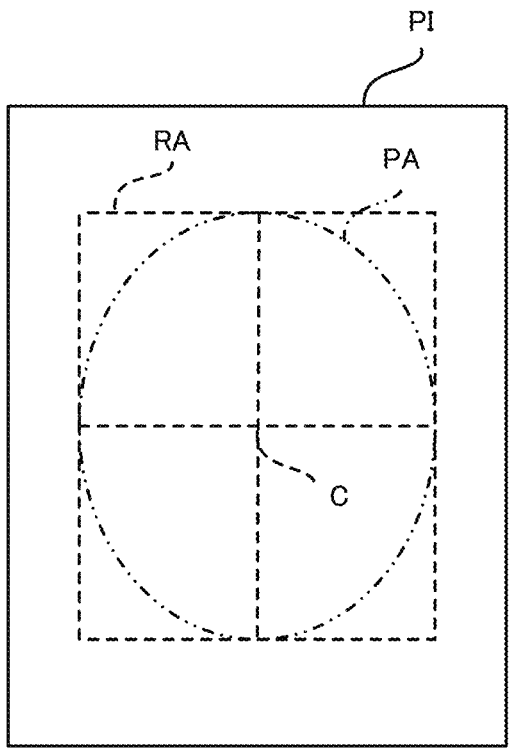
FIG. 4C is a conceptual diagram illustrating an information processing operation of the information processing apparatus in the second example embodiment.
Figure 4D:
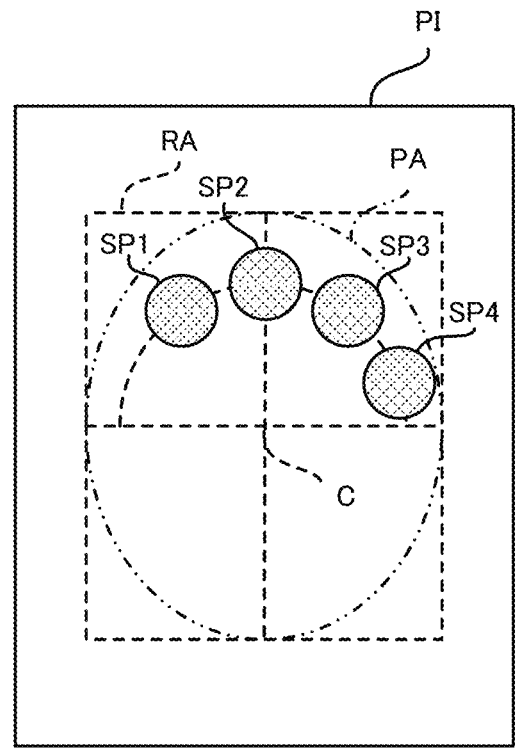
FIG. 4D is a conceptual diagram illustrating an information processing operation of the information processing apparatus in the second example embodiment.
Figure 5:
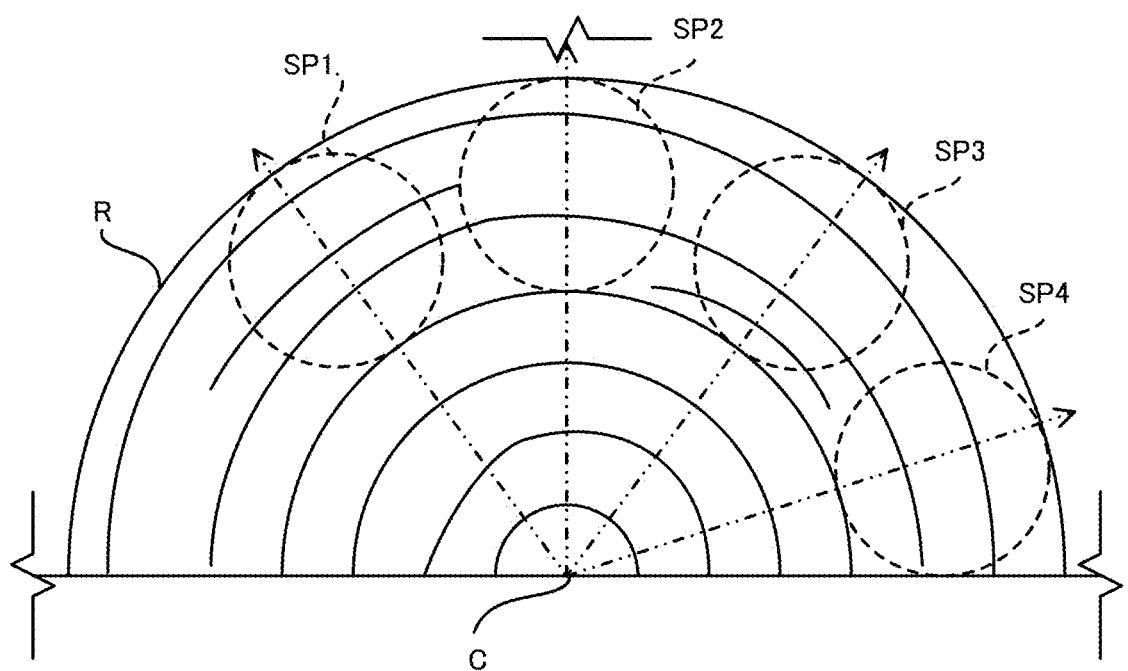
FIG. 5 is a conceptual diagram illustrating the information processing operation of the information processing apparatus in the second example embodiment.

With reference to FIG. 3 to FIG. 5, a flow of the information processing operation performed by the information processing apparatus 2 in the second example embodiment will be described. FIG. 3 is a flowchart illustrating the flow of the information processing operation performed by the information processing apparatus 2 in the second example embodiment. FIG. 4A to FIG. 4D and FIG. 5 are conceptual diagrams of the information processing operation of the information processing apparatus 2 in the second example embodiment.

The acquisition unit 211 acquires a pattern image obtained by imaging the ridges of a living body (step S20). The living body may be a finger, and the pattern image may be the fingerprint image PI including a pattern area PA formed by the ridges of the finger. The acquisition unit 211 may acquire the fingerprint image PI obtained by imaging the ridges of a living body. For example, the acquisition unit 211 may acquire a fingerprint image PI as illustrated in FIG. 4A.

The first setting unit 214 sets a rectangular area RA in the fingerprint image PI (step S21). The first setting unit 214 may set the rectangular area RA by estimating the pattern area PA in the fingerprint image PI. For example, the first setting unit 214 may set the rectangular area RA as illustrated in FIG. 4B. In FIG. 4B to FIG. 4D, for ease of visibility, the drawing of the pattern is omitted.

The second setting unit 215 sets a sampling point SP in the rectangular area RA of the fingerprint image PI, with a center C of the rectangular area RA as a reference point (step S22). The second setting unit 215 may extract the center C of the rectangular area RA as the reference point, for example, as illustrated in FIG. 4C.

The second setting unit 215 may set the sampling point SP in the fingerprint image PI on a side closer to the fingertip than the center C of the rectangular area RA. When a person places his or her finger on something, the person often places his or her finger from the fingertip. Therefore, when the sampling point SP is set on the fingertip side, the sampling point SP is set in the pattern area PA in many cases. Therefore, the second setting unit 215 may set the sampling point SP in the fingerprint image PI on the side closer to the fingertip than the center C of the rectangular area RA, for example, as illustrated in FIG. 4D.

Different parts in the fingerprint image PI may have different ridge spacing. For example, a sampling point SP1 and a sampling point SP3 illustrated in FIG. 5 are compared with a sampling point SP2 and a sampling point SP4. In this case, the sampling point SP1 and the sampling point SP3 are set in an area with short ridges, and thus, the ridge spacing in the sampling point SP1 and the sampling point SP3 is narrower than the ridge spacing in the sampling point SP2 and the sampling point SP4. Therefore, the normalization of the fingerprint image PI based on information obtained from any one sampling point SP may not be appropriate. In contrast, the normalization of the fingerprint image PI based on information obtained from a plurality of sampling points SP is more appropriate in many cases. Therefore, the second setting unit 215 may set a plurality of sampling points SP.

The second setting unit 215 may respectively set the plurality of sampling points SP at a plurality of positions located at the same distance from the reference point. The second setting unit 215 may respectively set four sampling points SP, for example, as illustrated in FIG. 4D.

For example, when the sample points are set on a horizontal line, there may be an area without any fingerprint. Therefore, the second setting unit 215 may respectively set the plurality of sampling points SP at a plurality of positions located at the same distance from the reference point. Since the fingerprints are often elliptical in shape, if the sampling points SP are set in a fan shape to match the elliptical shape as illustrated in FIG. 4D, it is likely that the sampling points SP can be set in an area with the fingerprints.

The estimation unit 212 estimates the ridge spacing of the sampling points SP (step S23). For example, the estimation unit 212 may measure the number of the ridges in a predetermined section included in each of the plurality of sampling points SP, and may estimate the ridge spacing from an average of measurement results. For example, as illustrated in FIG. 5, the estimation unit 212 may measure that the number of the ridges in the predetermined section included in the sampling point SP1 is "3". The estimation unit 212 may measure that the number of the ridges in the predetermined section included in the sampling point SP2 is "2". The estimation unit 212 may measure that the number of the ridges in the predetermined section included in the sampling point SP3 is "3". The estimation unit 212 may measure that the number of the ridges in the predetermined section included in the sampling point SP4 is "2". Then, the estimation unit 212 may estimate the ridge spacing on the basis of "2.5" that is an average of the measurement results.

The normalization unit 213 normalizes the size of the fingerprint image PI on the basis of the estimation result by the estimation unit 212 (step S24). The normalization unit 213 may estimate the size of the fingerprint image PI on the basis of the estimated ridge spacing.

The normalization unit 213 may determine an enlargement/reduction ratio on the basis of the estimation result by the estimation unit 212, and may normalize the size of the fingerprint image PI. For example, the normalization unit 213 may determine the enlargement/reduction ratio by comparing an average of the ridge spacing of a large amount of fingerprint images registered in a database such as a SD14 with the estimation result by the estimation unit 212. For example, the normalization unit 213 may use, as the enlargement/reduction ratio, a value obtained by dividing the above-described "average of the ridge spacing of a large amount of fingerprint images" by the "ridge spacing" estimated by the estimation unit 212. This allows the normalization unit 213 to convert the size of the fingerprint image PI to an average size.

2-3: Modified Example

Next, a modified example of the second example embodiment will be described. In the modified example, when one sampling point SP is manually set by a manager, the second setting unit 215 may automatically set a plurality of sampling points SP at a plurality of positions located at the same distance from the reference point as a distance to the manually set sampling point SP. FIG. 6A to FIG. 6D is a conceptual diagram of the modified example of the second example embodiment.

Figure 6A:
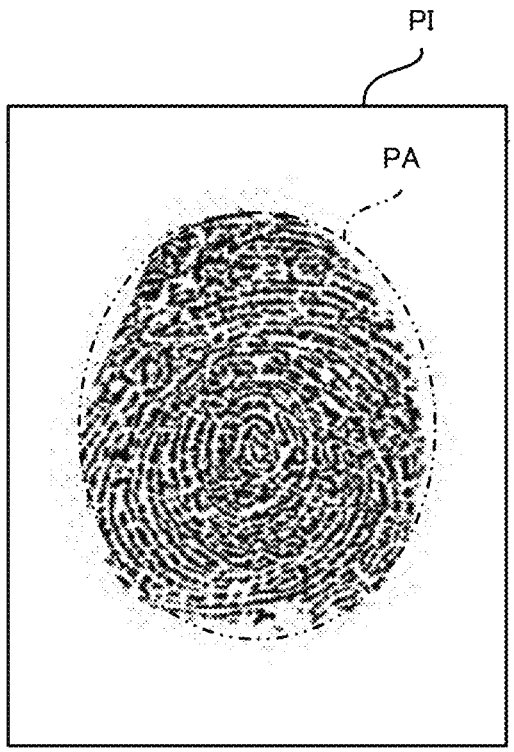
FIG. 6A is a conceptual diagram of a modified example of the second example embodiment.
Figure 6B:
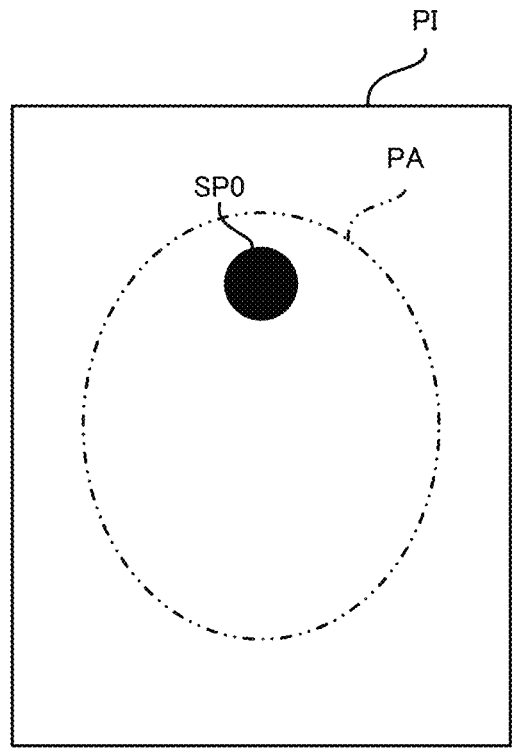
FIG. 6B is a conceptual diagram of a modified example of the second example embodiment.
Figure 6C:
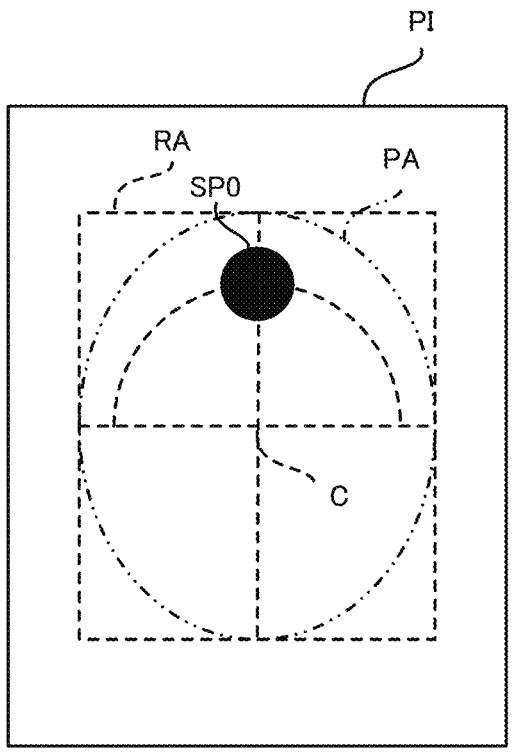
FIG. 6C is a conceptual diagram of a modified example of the second example embodiment.
Figure 6D:
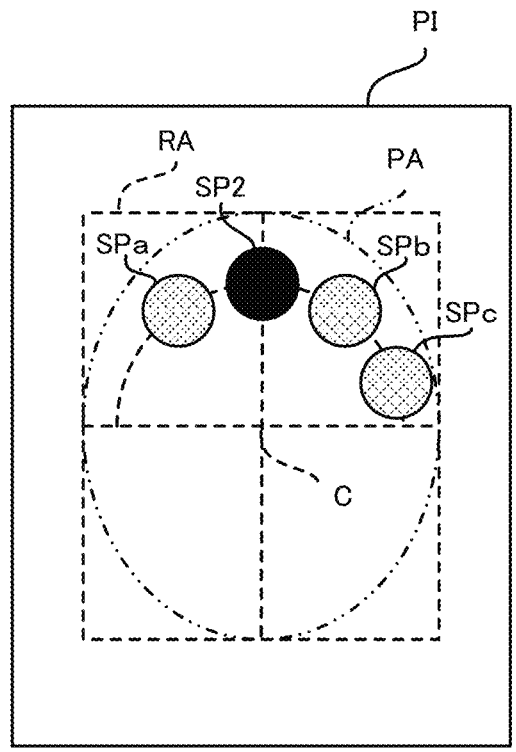
FIG. 6D is a conceptual diagram of a modified example of the second example embodiment.

FIG. 6A illustrates the fingerprint image PI acquired by the acquisition unit 211. For example, as illustrated in FIG. 6B, the manager may manually set a sampling point SP0 in the fingerprint image PI. A setting operation from the manager may be accepted/received by the input apparatus 24, for example. In FIG. 6B to FIG. 6D, for ease of visibility, the drawing of the pattern is omitted.

As illustrated in FIG. 6C, the first setting unit 214 may set the rectangular area RA, and the second setting unit 215 may obtain positions located at the same distance from the center C of the rectangular area RA. An arc illustrated by a broken line in FIG. 6C indicates the positions located at the same distance from the center C of the rectangular area RA.

As illustrated in FIG. 6 (Dd), the second setting unit 215 may respectively set a sampling point SPa, a sampling point SPb, and a sampling point SPc at a plurality of positions located at the same distance from the center C. Furthermore, as illustrated in FIG. 6D, the second setting unit 215 may set the sampling point SPa, the sampling point SPb, and the sampling point SPc in the fingerprint image PI on the side closer to the fingertip than the center C of the rectangular area RA.

The second example embodiment exemplifies that the first setting unit 214 sets the rectangular area RA in the fingerprint image PI, but a shape of the area set in the fingerprint image PI is not limited to be rectangular. For example, the first setting unit 214 may set an elliptical area corresponding to the fingerprint shape in the fingerprint image PI.

Furthermore, in the second example embodiment, the second setting unit 215 sets the sampling point SP in the fingerprint image PI on the side closer to the fingertip than the center section C of the rectangular area RA, but a location where the sampling point SP is set is not limited to this example. For example, if there is such an area suitable for the fingerprint authentication that is farther from the fingertip than the center C of the rectangular area RA of the fingerprint area PI, the second setting unit 215 may set the sampling point SP in the area that is farther from the fingertip than the center C of the rectangular area RA.

The second setting unit 215 may normalize the fingerprint image PI by at least one of the average of the ridge spacing and a ridge width.

2-4: Technical Effect of Information Processing Apparatus 2

Since the information processing apparatus 2 in the second example embodiment sets the sampling point SP in the rectangular area RA of the fingerprint image PI, with the center portion C of the rectangular area RA as the reference point, it is likely that the sampling point SP can be set in the pattern area PA. Since the information processing apparatus 2 sets the sampling point SP in the fingerprint image PI on the side closer to the fingertip than the center C of the rectangular area RA, it is likely that the sampling point SP can be set in an area with more fingerprints. Since the information processing apparatus 2 respectively sets a plurality of sampling points SP at a plurality of positions located at the same distance from the reference point, it is possible to accurately estimate the ridge spacing.

3: Third Example Embodiment

An information processing apparatus, an information processing method, and a recording medium in a third example embodiment will be described. The following describes the information processing apparatus, the information processing method, and the recording medium in the third example embodiment, by using an information processing apparatus 3 to which the information processing apparatus, the information processing method, and the recording medium in the third example embodiment are applied.

3-1: Configuration of Information Processing Apparatus 3

Figure 7:
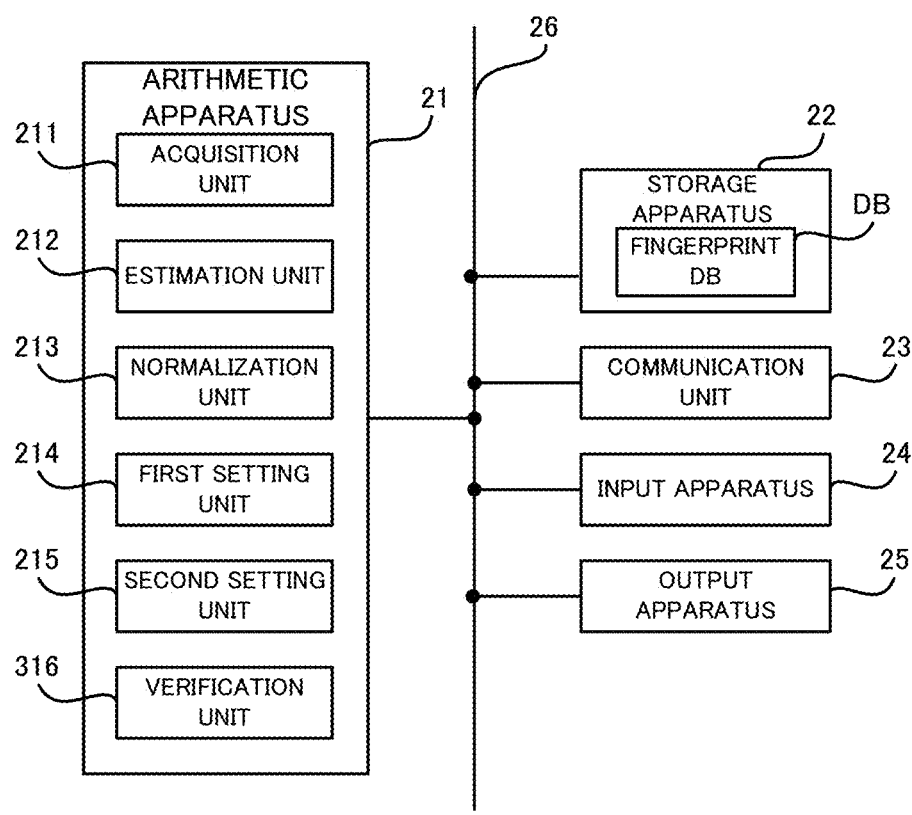
FIG. 7 is a block diagram illustrating a configuration of an information processing apparatus in a third example embodiment.

With reference to FIG. 7, a configuration of the information processing apparatus 3 in the third example embodiment will be described. FIG. 7 is a block diagram illustrating the configuration of the information processing apparatus 3 in the third example embodiment.

As illustrated in FIG. 7, the information processing apparatus 3 in the third example embodiment is different from the information processing apparatus 2 in the second example embodiment in that the arithmetic apparatus 21 includes a verification unit 316 and that the storage apparatus 22 stores a fingerprint database DB in which a registration pattern image is registered. The storage apparatus 22, however, may not store the fingerprint database DB. Other features of the information processing apparatus 3 may be the same as those of the information processing apparatus 2.

3-2: Information Processing Operation Performed by Information Processing Apparatus 3

Figure 8:
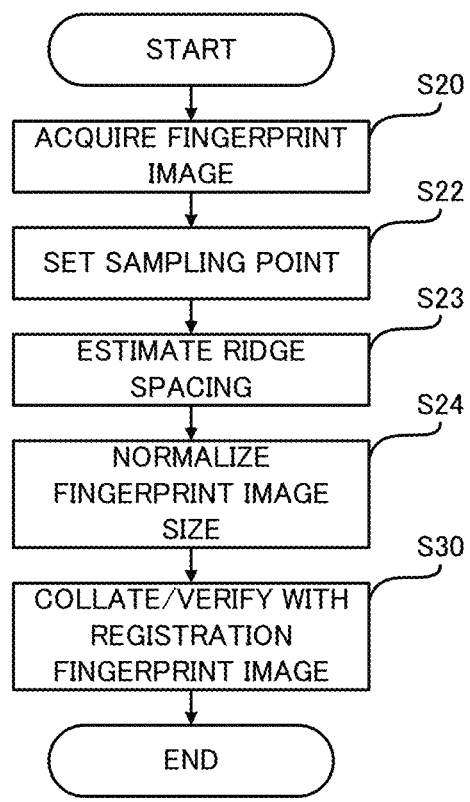
FIG. 8 is a flowchart illustrating a flow of the information processing operation performed by the information processing apparatus in the third example embodiment.

With reference to FIG. 8, a flow of the information processing operation performed by the information processing apparatus 3 in the third example embodiment will be described. FIG. 8 is a flowchart illustrating the flow of the information processing operation performed by the information processing apparatus 3 in the third example embodiment.

The acquisition unit 211 acquires the pattern image obtained by imaging the ridges of a living body (step S20). The estimation unit 212 sets the sampling point SP in the fingerprint image PI (step S22). The estimation unit 212 estimates the ridge spacing of the sampling point SP (step S23). The normalization unit 213 normalizes the size of the fingerprint image PI on the basis of the estimation result by the estimation unit 212 (step S24).

Figure 9A:
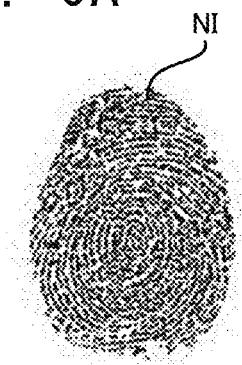
FIG. 9A is a conceptual diagram illustrating the information processing operation of the information processing apparatus in the third example embodiment.
Figure 9B:
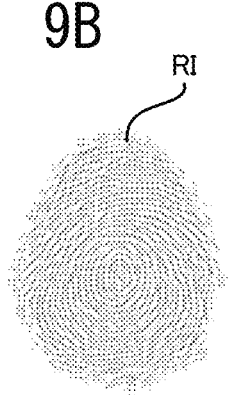
FIG. 9B is a conceptual diagram illustrating the information processing operation of the information processing apparatus in the third example embodiment.

The verification unit 316 verifies a normalized pattern image NI whose size is normalized by the normalization unit 213 with the registration pattern image registered in advance (step S30). The verification unit 316 may identify a ridge part from the normalized pattern image NI whose size is normalized, and may generate a ridge image RI as useful fingerprint information. The verification unit 316 may verify the ridge image RI with the registration pattern image registered in advance. FIG. 9A illustrates the normalized pattern image NI, and FIG. 9B illustrates the ridge image RI obtained by extracting the ridge part from the normalized pattern image NI. The registration pattern image may include information about the ridge image obtained by extracting the ridges. The verification unit 316 may extract feature quantities from the normalized pattern image NI, and may perform the verification with the registration pattern image registered in advance. The registration pattern image may include information about the feature quantities extracted from the registration pattern image.

3-3: Technical Effect of Information Processing Apparatus 3

For example, in the verification of the fingerprint images PI of different sizes, a high score may not be obtained and the verification may be failed. In the verification of the fingerprint images PI of the same sizes, however, a high score may be obtained. Since the information processing apparatus 3 in the third example embodiment verifies the normalized pattern image NI with the registration pattern image registered in advance, a probability of successful verification is improved.

4: Fourth Example Embodiment

An information processing apparatus, an information processing method, and a recording medium in a fourth example embodiment will be described. The following describes the information processing apparatus, the information processing method, and the recording medium in the fourth example embodiment, by using an information processing apparatus 4 to which the information processing apparatus, the information processing method, and the recording medium in the fourth example embodiment are applied.

4-1: Configuration of Information Processing Apparatus 4

Figure 10:
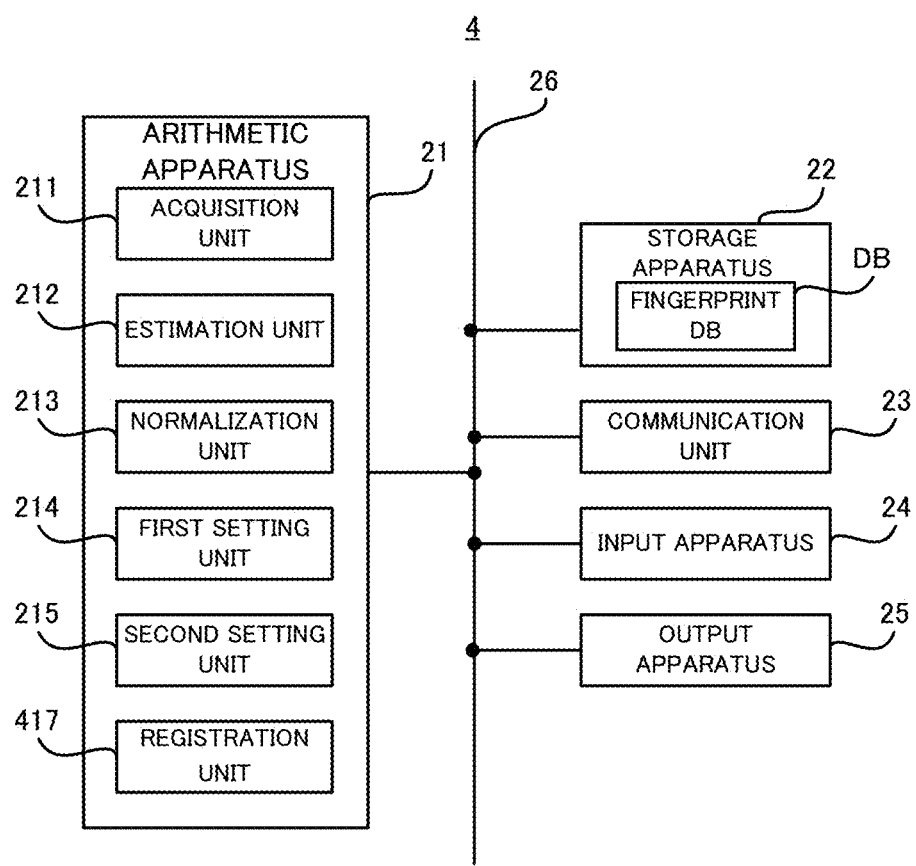
FIG. 10 is a block diagram illustrating a configuration of an information processing apparatus in a fourth example embodiment.

With reference to FIG. 10, a configuration of the information processing apparatus 4 in the fourth example embodiment will be described. FIG. 10 is a block diagram illustrating the configuration of the information processing apparatus 4 in the fourth example embodiment.

As illustrated in FIG. 10, the information processing apparatus 4 in the fourth example embodiment is different from the information processing apparatus 2 in the second example embodiment and the information processing apparatus 3 in the third example embodiment in that the arithmetic unit 21 includes a registration unit 417 and that the storage apparatus 22 stores a fingerprint database DB in which a registration pattern image is registered. The storage apparatus 22, however, may not store the fingerprint database DB. Other features of the information processing apparatus 4 may be the same as those of at least one of the information processing apparatus 2 and the information processing apparatus 3.

4-2: Information Processing Operation Performed by Information Processing Apparatus 4

Figure 11:
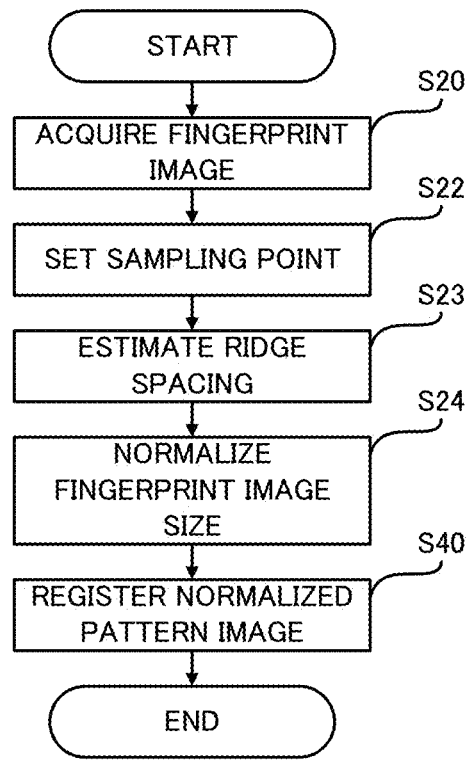
FIG. 11 is a flowchart illustrating a flow of the information processing operation performed by the information processing apparatus in the fourth example embodiment.

With reference to FIG. 11, a flow of the information processing operation performed by the information processing apparatus 4 in the fourth example embodiment will be described. FIG. 11 is a flowchart illustrating the flow of the information processing operation performed by the information processing apparatus 4 in the fourth example embodiment.

The acquisition unit 211 acquires the pattern image obtained by imaging the ridges of a living body (step S20). The estimation unit 212 sets the sampling point SP in the fingerprint image PI (step S22). The estimation unit 212 estimates the ridge spacing of the sampling point SP (step S23). The normalization unit 213 normalizes the size of the fingerprint image PI on the basis of the estimation result by the estimation unit 212 (step S24).

The registration unit 417 registers in the storage apparatus the normalized pattern image NI whose size is normalized by the normalization unit 213, as the registration pattern image (step S40). The registration unit 417 may register the normalized pattern image NI whose size is normalized, as the registration pattern image, in the fingerprint database DB of the storage apparatus 22.

4-3: Technical Effect of Information Processing Apparatus 4

Since the information processing apparatus 4 in the fourth example embodiment registers the fingerprint image PI whose size is normalized to the same size, it is possible to reduce a processing load at the time of verification of the fingerprint image PI.

5: Supplementary Notes

With respect to the example embodiments described above, the following Supplementary Notes are further disclosed.

[Supplementary Note 1]
An information processing apparatus including:
an acquisition unit that acquires a pattern image obtained by imaging ridges of a living body;
an estimation unit that sets a sampling point in the pattern image and estimates ridge spacing of the sampling point; and
a normalization unit that normalizes a size of the pattern image on the basis of an estimation result by the estimation unit.

[Supplementary Note 2]
The information processing apparatus according to Supplementary Note 1, further including:
a first setting unit that sets a rectangular area in the pattern image; and
a second setting unit that sets the sampling point in the rectangular area of the pattern image, with a center of the rectangular area as a reference point.

[Supplementary Note 3]
The information processing apparatus according to Supplementary Note 2, wherein
the pattern image is a fingerprint image, and
the second setting unit sets the sampling point in the pattern image on a side closer to a fingertip than the center of the rectangular area.

[Supplementary Note 4]
The information processing apparatus according to Supplementary Note 2 or 3, wherein the second setting unit respectively sets a plurality of sampling points at a plurality of positions located at a same distance from the reference point.

[Supplementary Note 5]
The information processing apparatus according to any one of Supplementary Notes 1 to 4, further including a verification unit that verifies a normalized pattern image obtained by the normalization unit normalizing the size of the pattern image, with a registration pattern image registered in advance.

[Supplementary Note 6]
The information processing apparatus according to any one of Supplementary Notes 1 to 5, further including a registration unit that registers in a storage apparatus a normalized pattern image obtained by the normalization unit normalizing the size of the pattern image, as a registration pattern image.

[Supplementary Note 7]
An information processing method including:
acquiring a pattern image obtained by imaging ridges of a living body;
setting a sampling point in the pattern image and estimating ridge spacing of the sampling point; and
normalizing a size of the pattern image on the basis of an estimation result.

[Supplementary Note 8]
A non-transitory recording medium on which a computer program that allows a computer to execute an information processing method is recorded, the information processing method including:
acquiring a pattern image obtained by imaging ridges of a living body;
setting a sampling point in the pattern image and estimating ridge spacing of the sampling point; and
normalizing a size of the pattern image on the basis of an estimation result.

At least a part of the constituent components of each of the example embodiments described above can be combined with at least another part of the constituent components of each of the example embodiments described above, as appropriate. A part of the constituent components of each of the example embodiments described above may not be used. Furthermore, to the extent permitted by law, all the references (e.g., publications) cited in this disclosure are incorporated by reference as a part of the description of this disclosure.

This disclosure is not limited to the examples described above and is allowed to be changed, if desired, without departing from the essence or spirit of this disclosure which can be read from the claims and the entire identification. An information processing apparatus, an information processing method, and a recording medium with such changes are also intended to be within the technical scope of this disclosure.

DESCRIPTION OF REFERENCE CODES 1, 2, 3, 4 Information processing apparatus
11, 211 Acquisition unit
12, 212 Estimation unit
13, 213 Normalization unit
214 First setting unit
215 Second setting unit
316 Verification unit
417 Registration unit
PI Fingerprint image
RA Rectangular area
C Center
SP Sampling point
NI Normalized pattern image
RI Ridge image

What is claimed is:

1. An information processing apparatus comprising:
at least one memory that is configured to store instructions; and
at least one processor that is configured to execute the instructions to:
acquire a pattern image obtained by imaging ridges of a living body;
set a sampling area in the pattern image and estimate ridge spacing of the sampling area;
determine an enlargement/reduction ratio of the pattern image on the basis of an estimation result to normalize a size of the pattern image;
set a rectangular area in the pattern image; and
set the sampling area in the rectangular area of the pattern image, with a center of the rectangular area as a reference point.

2. The information processing apparatus according to claim 1, wherein:
the pattern image is a fingerprint image, and
the at least one processor is configured to execute the instructions to set the sampling area in the pattern image on a side closer to a fingertip than the center of the rectangular area.

3. The information processing apparatus according to claim 1, wherein the at least one processor is configured to execute the instructions to respectively set a plurality of sampling areas on a sector-shaped arc centered at the center of the rectangular area.

4. The information processing apparatus according to claim 1, wherein the at least one processor is configured to execute the instructions to collate/verify a normalized pattern image obtained by normalizing the size of the pattern image, with a registration pattern image registered in advance.

5. The information processing apparatus according to claim 1, wherein the at least one processor is configured to execute the instructions to register in a storage apparatus a normalized pattern image obtained by normalizing the size of the pattern image, as a registration pattern image.

6. An information processing method comprising:
acquiring a pattern image obtained by imaging ridges of a living body;
setting a sampling area in the pattern image and estimating ridge spacing of the sampling area;
determining an enlargement/reduction ratio of the pattern image on the basis of an estimation result to normalize a size of the pattern image;
setting a rectangular area in the pattern image; and
setting the sampling area in the rectangular area of the pattern image, with a center of the rectangular area as a reference point.

7. A non-transitory recording medium on which a computer program that allows a computer to execute an information processing method is recorded, the information processing method including:
acquiring a pattern image obtained by imaging ridges of a living body;
setting a sampling area in the pattern image and estimating ridge spacing of the sampling area;
determining an enlargement/reduction ratio of the pattern image on the basis of an estimation result to normalize a size of the pattern image on the basis of an estimation result;
setting a rectangular area in the pattern image; and
setting the sampling area in the rectangular area of the pattern image, with a center of the rectangular area as a reference point.

* * * * *